United States Patent
Kopp et al.

(10) Patent No.: US 10,601,847 B2
(45) Date of Patent: Mar. 24, 2020

(54) DETECTING USER BEHAVIOR ACTIVITIES OF INTEREST IN A NETWORK

(71) Applicant: Cisco Technology, Inc., San Jose, CA (US)

(72) Inventors: Martin Kopp, Lochovice (CZ); Lukas Machlica, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 130 days.

(21) Appl. No.: 15/629,906

(22) Filed: Jun. 22, 2017

(65) Prior Publication Data

US 2018/0375884 A1 Dec. 27, 2018

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01)

(58) Field of Classification Search
CPC . H04L 41/0893; H04L 47/20; H04L 41/5054; H04L 12/14; H04L 67/306; H04L 41/0806; H04L 67/34; H04L 41/5003; H04L 41/5025; H04L 47/2408; H04L 67/26; H04L 67/327; H04L 41/0876; H04L 51/046; H04L 63/0236; H04L 63/0853; H04L 63/0892; H04L 67/145; H04L 67/2819; H04L 9/32; H04L 9/3247;
(Continued)

(56) References Cited

U.S. PATENT DOCUMENTS

2011/0023115 A1* 1/2011 Wright ............... G06F 21/552
726/22
2013/0262216 A1* 10/2013 Zhang ................ G06Q 30/02
705/14.36
(Continued)

OTHER PUBLICATIONS

Khin Moh Mph Aung, et al., "Association Rule Pattern Mining Approaches Network Anomaly Detection", ISBN 978-93-84468-20-0, Proceedings of 2015 International Conference on Future Computational Technologies (ICFCT'2015), Singapore, Mar. 29-30, 2015, pp. 164-170, http://dx.doi.org/10.17758/UR.U0315248, 7 pages.
(Continued)

*Primary Examiner* — Djenane M Bayard
(74) *Attorney, Agent, or Firm* — Edell, Shapiro & Finnan, LLC

(57) ABSTRACT

A user behavior activity detection method is provided in which network traffic relating to user behavior activities in a network is monitored. Data is stored representing network traffic within a plurality of time periods, each of the time periods serving as a transaction. Subsets of the network traffic in the transactions are identified as traffic suspected of relating to certain user behavior activities. The subsets of the network traffic in the transactions are assigned into one or more groups. A determination is made of one or more detection rules for each of the one or more groups based on identifying, for each of the groups, a number of user behavior activities common to each of the subsets of the network traffic. The one or more detection rules are used to monitor future network traffic in the network to detect occurrence of the certain user behavior activities.

20 Claims, 5 Drawing Sheets

(58) Field of Classification Search
CPC . H04L 47/14; H04L 41/0896; H04L 41/5029; H04L 12/1492; H04L 12/1496; H04L 41/5006; H04L 41/5022; H04L 47/2425
See application file for complete search history.

(56) References Cited

U.S. PATENT DOCUMENTS

| | | |
|---|---|---|
| 2014/0068763 A1 | 3/2014 | Ward et al. |
| 2014/0075558 A1 | 3/2014 | Ward et al. |
| 2015/0373039 A1 | 12/2015 | Wang |
| 2016/0065601 A1 | 3/2016 | Gong et al. |
| 2016/0241576 A1* | 8/2016 | Rathod ............... H04L 63/1425 |
| 2017/0054738 A1 | 2/2017 | Avidan et al. |
| 2017/0103133 A1* | 4/2017 | Xiong ....................... G06F 7/24 |
| 2018/0084012 A1* | 3/2018 | Joseph ............... H04L 63/1416 |

OTHER PUBLICATIONS

Jiawei Han, et al., "Mining Frequent Patterns without Candidate Generation: A Frequent-Pattern Tree Approach", Data Mining and Knowledge Discovery, 8, 53-87, 2004, 35 pages.
Rakesh Agrawal, et al., "Fast Algorithms for Mining Association Rules", Proceedings of the 20th VLDB Conference, Santiago, Chile, 1994, vol. 1215, 13 pages.
Onur Catakoglu, et al., "Automatic Extraction of Indicators of Compromise for Web Applications", Proceedings of the 25th International Conference on World Wide Web, WWW'16, Montreal, Quebec, Canada, Apr. 11-15, 2016, ACM 978-1-4503-4143-1/16/04, http://dx.doi.org/10.1145/2872427.2883056, 11 pages.

* cited by examiner

DETECTING USER BEHAVIOR ACTIVITIES OF INTEREST IN A NETWORK

TECHNICAL FIELD

The present disclosure relates to detecting user behavior activities of interest.

BACKGROUND

Malware is a cost to computer and network users in all types of environments. It remains a challenge to correctly and effectively detect malicious software. For example, malware may perform an Internet Protocol (IP) address check to discover an IP address of the machine it is hosted on, contact a web site to determine a date or time, or check whether it is behind a proxy. Such behavioral patterns are more stable, and as a result it is much more difficult to change them than commonly-used malware signatures. Other activities related to the presence of malware may include software updating, downloading of graphical images, communications with a Domain-name Generating Algorithm (DGA) domain, and other suspicious activities. Although each one of these activities may appear suspicious, when presented alone, the activity may not be sufficient to conclude the existence of malware.

Other types of user behavior activities in a network may be of interest, even activities which are relatively benign.

DESCRIPTION OF EXAMPLE EMBODIMENTS

Overview

Figure 1:
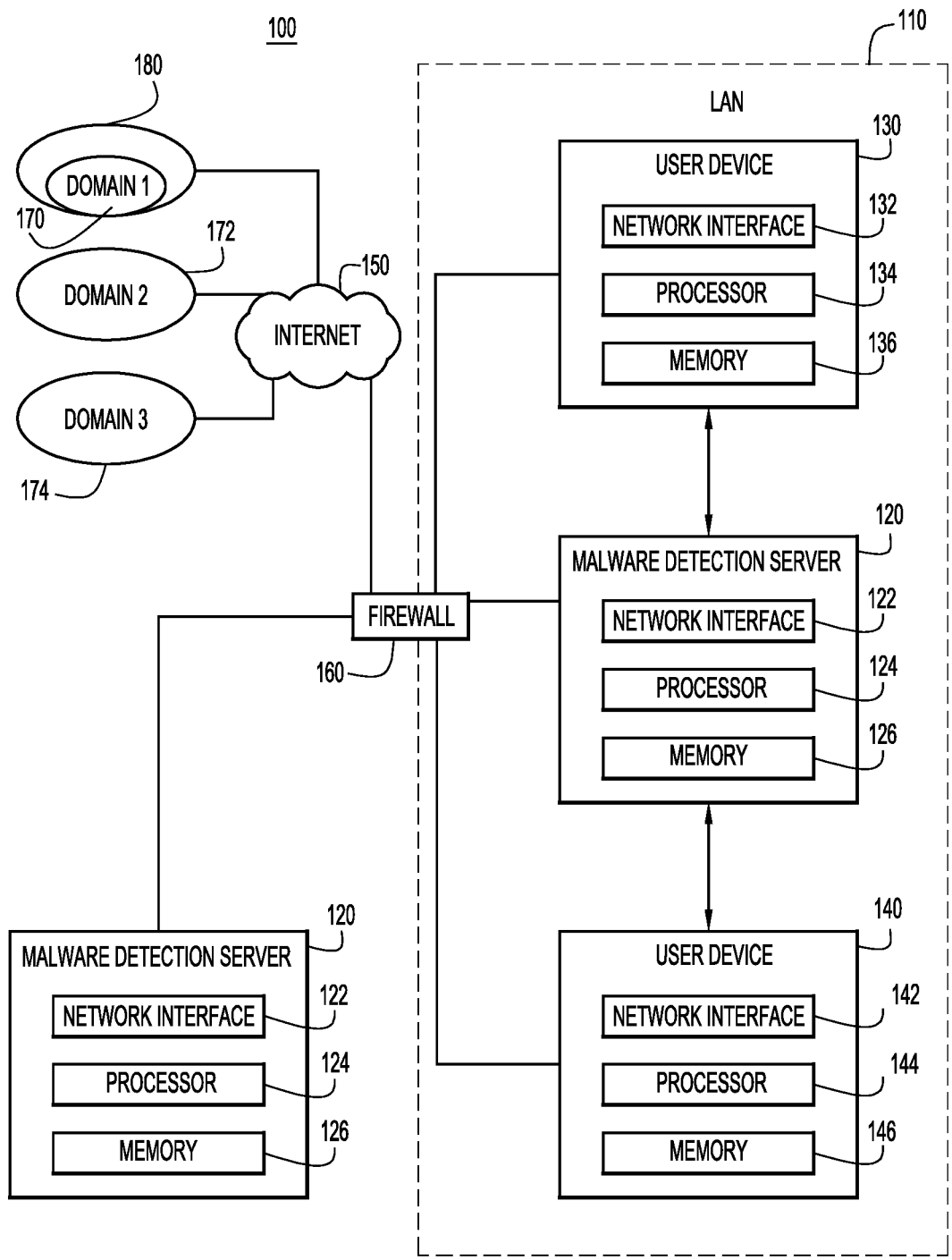
FIG. 1 depicts a system for detecting malware as an example of detecting a user behavior activity of interest in network, according to an example embodiment.

In one embodiment, a method for detecting certain user behavior activities of interest may be performed by a server in a network or outside of a network. The server monitors network traffic relating to user behavior activities in the network. The server stores data representing network traffic within a plurality of time periods. Each of the time periods serves as a transaction such that data for each of a plurality of transactions comprising one or more user behavior activities is stored over time. Subsets of the network traffic in the transactions as traffic suspected of relating to the certain user behavior activities are identified. The server assigns the subsets of the network traffic in the transactions into one or more groups based on one or more types of certain user behavior activities. The server determines one or more detection rules for each of the one or more groups based on identifying, for each of the groups, a number of user behavior activities common to each of the subsets of the network traffic. The one or more detection rules are used to monitor future network traffic in the network to detect occurrence of the certain user behavior activities.

Example Embodiments

Presented herein are techniques for detecting certain user behavior activities of interest. As used in this disclosure, user behavior activities include actions performed by a user device including work stations, desktop computers, laptop computers, smart phones, tablets, and generally any other electronic devices that can be used to access networks. Moreover, user behavior activities may include actions performed by software running in a virtualized user space in a data center/cloud computing environment. Examples of certain user behavior activities of interest may include certain benign user behavior activities that a network administrator is interested in monitoring. For example, it may be of interest to understand network activities of a new software application that is installed on a user device or multiple user devices. Certain user behavior activities may also include user behavior activities that a network administrator deems undesirable, such as downloading the latest software update that the network administrator does not wish to permit, or downloading and installing software that violates certain network policies. Further examples of certain user behavior activities may also include activities related to malware, such as network traffic related to: an IP address check, a destination with low popularity, "TOR" (anonymous web-browsing) usage, use of DGAs, a connection check, use of online storage services (e.g., Dropbox™), and so on. Although not intended to be limiting, the techniques presented herein are initially described for the detection of user behavior activities related to malware. However, these techniques can be applied to any type of user behavior activities in a network that are of interest, whether the activities are benign or malign.

The challenges addressed by the techniques presented herein include how to find similarities in behavior of users related to traffic activities. For example, malware often has to perform an IP address check to discover an IP address of the machine on which it is hosted, contact a website for a date or time check, determine whether it is behind a proxy, etc., as mentioned above. It has been determined that such behavioral patterns are more stable and it is also much harder to change them than commonly used malware signatures. Although some activities may be suspicious, they are still not conclusive evidence of malware when presented alone. Therefore, the techniques presented herein determine how to identify and combine such weak Indicators of Compromise (IoCs) to produce conclusive evidence of malware activity in a network. These methods are analogous to market-basket analysis techniques where, for a given set of shopping transactions with purchased items, the task is to find all other items that are likely to co-occur and are therefore frequently purchased together.

Network traffic can be monitored over a period of time, e.g., one day, and saved as a transaction. Over time, a plurality of transactions are recorded. For example, if a transaction includes all network traffic that occurred in one day, a thirty-day period can generate thirty transactions. User behavior activities can be detected directly from the network traffic and may be represented as one item in a transaction. Each suspicious user behavior activity can be regarded as a weak IoC, representing different events in the traffic, but alone is not sufficient to trigger a security incident. The techniques presented herein involve finding sets of user behavior activities/items that are likely to co-occur in malware related traffic and are therefore likely to describe malware behavioral patterns in the network.

One example detection rule may take the form: if {A, B, C, D}->MALWARE, where A, B, C, D are different user activities frequently co-occurring in the malware traffic.

More precisely, given an investigation window of a pre-specified length of time (e.g. 24 hours), a set of all the user behaviors present in that window compose a transaction. As known in the art, the "support" of an item denotes the occurrence frequency of an item in a transaction database. Similarly, the "confidence" of a rule, in terms of classification, represents the precision of an extracted rule (i.e. ratio of correct malware detections out of all detections attributed to this rule).

Reference is first made to FIG. 1. FIG. 1 depicts a system 100 in which techniques for detecting malicious user behavior activities related to malware can be applied, according to an example embodiment. Again, as explained above, the techniques described with respect to FIG. 1 may be extended to detection of any type of user behavior activities of interest in a network. The system 100 includes a network 110, which further includes a malware detection server 120 and a number of nodes, represented in FIG. 1 by node 130 and node 140. The network 110 may be, for example, a local area network (LAN), which may be an enterprise network or home network. In some embodiments, the malware detection server 120 may also be deployed independently of the cloud (i.e., off-cloud, such as on-premises) or in the cloud (outside of the network 110). Thus, in FIG. 1, the malware detection server 120 is shown either inside or outside of network 110. More generally, the malware detection server 120 may be referred to as a "detection server" that is configured to detect certain user behavior activities of interest in the network 110.

Regardless of its location, the malware detection server 120 includes a network interface 122 configured to provide connectivity to the Internet 150 through a firewall 160 of the network 110. In one example, the network interface 122 may take the form of one or more network interface cards. For example, the network interface 122 may receive network traffic from the nodes 130 and 140 and from firewall 160, and receive traffic into the network 110 from outside (the Internet 150) and send traffic out of the network 110 to the Internet 150.

The malware detection server 120 further includes a processor 124 configured to execute instructions stored in memory 126. The memory 126 may store malware intelligence data, such as policies or rules for network security and/or identifying malicious user behavior activities, as well as instructions for generating the policies or rules. That is, the malware detection server 120 may be configured to generate rules for detecting malicious user behavior activities or identifying network intrusions (i.e., security violations), and in at least some instances, take actions when network intrusions are identified, such as blocking network traffic identified as malicious.

The functions of the processor 124 may be implemented by logic encoded in one or more tangible (non-transitory) computer-readable storage media (e.g., embedded logic such as an application specific integrated circuit, digital signal processor instructions, software that is executed by a processor, etc.), wherein the memory 126 stores software or processor executable instructions that are executed to carry out the operations described herein.

Generally, memory 126 may include read only memory (ROM), random access memory (RAM), magnetic disk storage media devices, optical storage media devices, flash memory devices, electrical, optical or other physical/tangible (i.e., non-transitory) memory storage devices. Thus, the memory 126 may be or include one or more tangible (non-transitory) computer readable storage media (i.e., a memory device) encoded with software comprising computer executable instructions. For example, memory 126 may store instructions that may be executed by processor 124 for detecting malicious network traffic and/or generating intrusion intelligence data (rules for detecting malicious user behavior activities). In other words, memory 126 may include instructions, that when executed by one or more processors, cause the one or more processors to carry out operations of the malware detection server 120 described herein.

Still referring to FIG. 1, for simplicity, the network 110 is shown only with two computing nodes (computing nodes 130 and 140); however, the network 110 may be of any desirable size and including hundreds or thousands of computing nodes. For example, the network 110 may be a university network of any size, a corporate network of any size, or any other such network. Computing node 130 and computing node 140 include network interface equipment 132 and network interface equipment 142, respectively, to provide network connectivity through firewall 160 such that node 130 and node 140 may connect to a number of domains outside of the network 110 via the Internet 150. For example, node 130 and node 140 may connect to domain 1 shown at reference numeral 170, domain 2 shown at reference numeral 172, and domain 3 shown at reference numeral 174, at least one of which may be hosted by a malicious user or server, such as a Command & Control (C&C) Server 180 (i.e., a botnet server), infected by malware, or otherwise used to generate malicious network traffic. In some embodiments, the nodes 130 and 140 may route their network traffic through the malware detection server 120 through their respective link to the malware detection server 120. The firewall 160 generates logs of network communications and may send those logs to the malware detection server 120 or otherwise store the logs at a location accessible by the malware detection server 120. The computing node 130 may also include a processor 134 and the computing node 140 includes a processor 144. The computing nodes shown in FIG. 1 may take the form of any of user devices described above.

In FIG. 1, malware 136 resides and is executed on computing node 130 while malware 146 resides and is executed on computing node 140. As used herein, malware 136 and malware 146 refer to executable files that each cause a computer/processor to execute instructions. The malware may be in a machine language, interpreted language, intermediate language, script language or any other language now known or hereinafter developed that causes a computer/processor to execute instructions. In some embodiments, network 110 may include, but is not limited to, a plurality of computing devices, servers and other network devices that may or may not be infected by malware.

Mining detection rules from a transaction database is a technique for frequent pattern mining algorithms. For all known algorithms, with increasing numbers of items, an exponential growth related to the number of mined rules has been observed. For example, given a transaction of N unique items, the number of all possible rules (combinations of items in the item set) that can be mined is $2^N$, which for large N (e.g., N>400) is computationally intractable. Commonly, this issue is solved by setting the threshold for support of an item sufficiently high and discarding all the items with lower support in order to reduce the number of used items.

In the case of intrusion detection, where most of the traffic is benign, focusing only on user behavior activities that occur most often would significantly lower the chance to mine a rule for detecting rare malware traffic. In one embodiment, the task for generating/mining rules for detecting malware is to find not only one, best performing rule, but all the unique rules that describe the malware behavior in traffic of a user with sufficiently high confidence.

Figure 2:
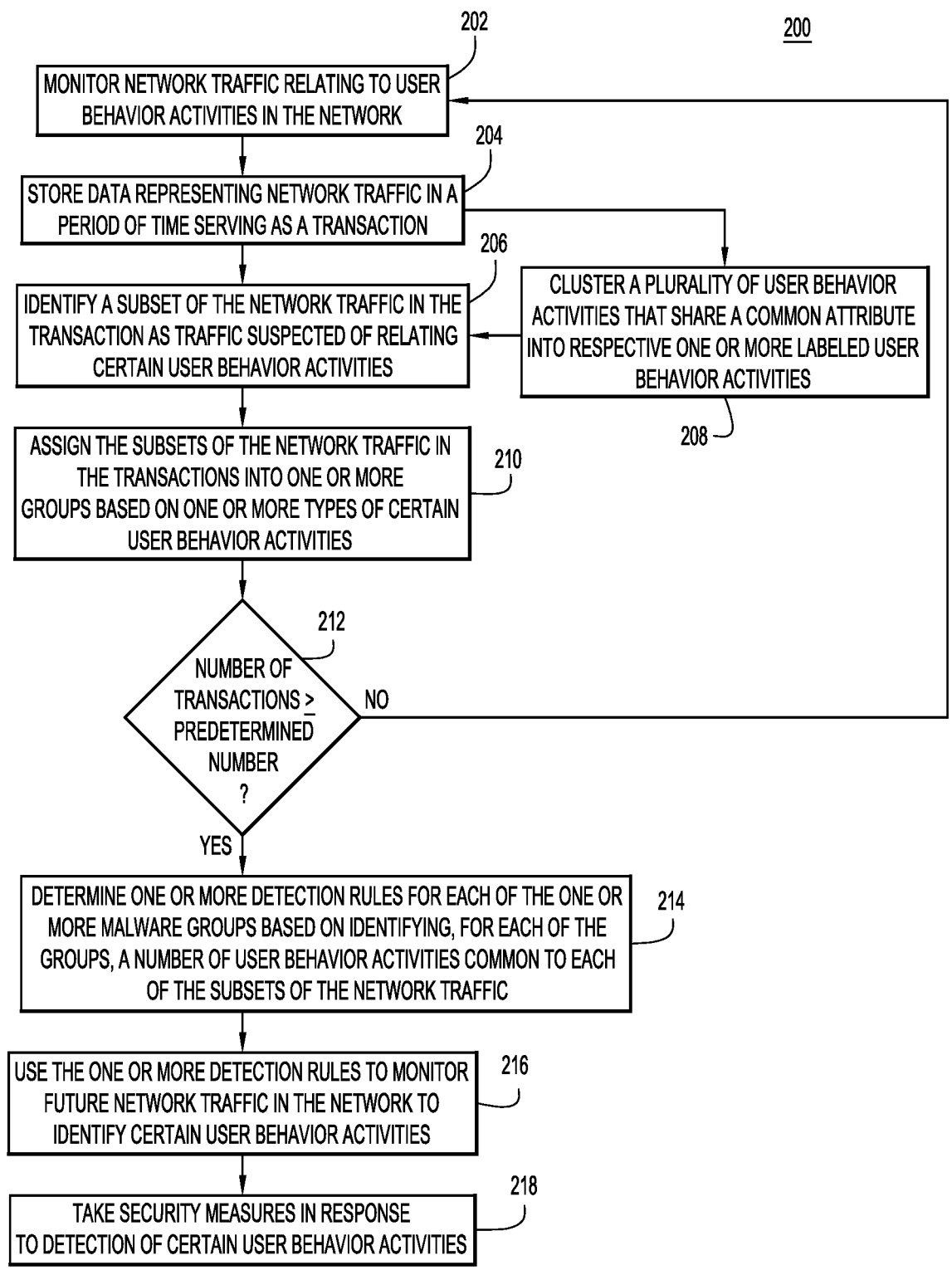
FIG. 2 depicts a flow chart illustrating a method for mining rules used for detecting user behavior activities of interest in a network, according to an example embodiment.

Techniques for detecting user behavior activities of interest will now be described with reference to FIG. 2. FIG. 2 depicts a flow chart of a method 200 for detecting certain user behavior activities of interest, according to an example embodiment. At 202, a detection server is configured to monitor network traffic relating to user behavior activities in the network. For example, as shown in FIG. 1, the computing nodes 130 and 140 access Internet 150 through firewall 160. Thus, the detection server can obtain information (logs) descriptive of egress and ingress network traffic from the firewall 160. At 204, the detection server stores the network traffic monitored within a period of time as a transaction. For example, the period of time can be 12 hours, one day, two days, or any other time period. In one embodiment, as in FIG. 1, an administrator of network 110 may be aware that one or more of the computing nodes have been compromised by malware, or that software has been installed on one or more of the computing nodes, or some other user behavior activity of interest has occurred in one or more of the computing nodes. The detection server retrieves historical network traffic stored in firewall 160 or obtains network traffic in real-time from firewall 160. At 206, the detection server is configured to identify a subset of the network traffic in the transactions as traffic suspected of relating to certain user behavior activities of interest. For example, the certain user behavior activities may include malware activities including network traffic related to IP address checks, a destination with low popularity, TOR web browser usage, use of a DGA, a connection check, use of online storage services, software updating, downloading of graphical images, etc. For example, the malware 136 or 146 may control computing nodes 130 or 140 to perform these suspicious user behavior activities. For example, if a banking system is infected by a banking Trojan, it is possible to identify particular malicious user behavior activities of the banking Trojan.

In some embodiments, before performing operation 206, at 208 the detection server may be configured to cluster a plurality of user behavior activities that share a common attribute into respective one or more labeled user behavior activities. For example, instead of three different user behavior activities/items: "image-sharing," "music-sharing," and "document-sharing" related to different services, those three user behavior activities are clustered under a single user behavior activity/item label, such as "sharing service". Thus, three user behavior activities are collapsed into one, decreasing the overall number of user behavior activities in the transaction while preserving the information content in those user behavior activities. In one embodiment, the clustering may be a hierarchical clustering using a clustering algorithm or clustering tree defined by domain experts to create labels (e.g., sharing service) of semantically similar user behavior activities. When performing further actions on the user behavior activities, the labeled user behavior activities can be used in instead of those activities that have been clustered into the labeled user behavior activities.

At 210, the detection server is configured to assign a subset of the network traffic in the transaction into one or more groups based on one or more types of certain user behavior activities of interest. For example, in the case of malware user behavior activities, the subset of the network traffic in the transaction may be assigned to one or more malware groups of click-fraud, ad-injector, information stealer, banking Trojan, exfiltration, or any other known or later-developed malware types. Each group is represented by a different, but not necessarily disjointed, set of activities (behavioral patterns). At 212, the detection server determines whether the number of transactions that has been processed according to operations 202-210 is equal to or greater than a predetermined number. For example, to have a sufficient number of samples for mining a rule for monitoring future network traffic and detecting user behavior activities contained therein, the predetermined number may be 10, 20, or 30 transactions, depending on whether a rule or rules generated in method 200 are accurate, as will be explained hereafter.

If the number of transactions that has been processed according to operations 202-210 is less than the predetermined number (No at 212), the method 200 returns to operation 202 so that the detection server may repeat the operations 202-212 for more transactions, as described above. In some embodiments, the detection server may be configured to process multiple transactions in parallel or in series, or a combination of parallel and series processing.

If the number of transactions that has been processed according to operations 202-210 is equal to or greater than the predetermined number (Yes at 212), at 214 the detection server determines (generates or "mines") one or more detection rules for each of the one or more groups based on identifying, for each of the groups, a number of user behavior activities common to each of the subsets of the network traffic. For example, if each subset of network traffic of a particular malware group (e.g., banking Trojan) includes user behavior activities A, B, C, D, a rule for detecting a banking Trojan may be read as: {A, B, C, D}->banking Trojan. That is, the detection server can conclude that user behavior activities A, B, C, D, although different, frequently co-occur in traffic caused by an intruded banking Trojan malware.

To address a potential challenge of infrequent or rare pattern mining, the following may be employed. In one embodiment, the detection server may execute a data-mining algorithm (e.g. a Frequent Pattern (FP) growth algorithm) on the subsets of the transactions extracted from all traffic related to a specific user behavior activity category/group (e.g. banking Trojan). In one embodiment, for each of the groups, the detection server identifies a number of user behavior activities common to each of subsets of the network traffic in the group to mine one or more rules for the group. In one embodiment, a threshold number of user behavior activities common to each of subsets of the network traffic in the group is equal to or greater than three (3) in order to determine a rule for detecting a certain type of user behavior activity. In another embodiment, the threshold number of user behavior activities common to each of subsets of the network traffic in the group can be configurable. Thus, only rules with at least a predetermined number of items are kept since, the longer a transaction is, the more descriptive it is. Short transactions may not be particularly informative. Using these techniques, instead of finding infrequent patterns related to certain user behavior activity in all network traffic, the detection server can find frequent patterns in the reduced database, i.e., the subsets of all network traffic, containing the transactions related to certain user behavior activity.

At 216, the detection server is configured to use the one or more detection rules determined at 214 to monitor future network traffic in the network to detect occurrence of certain user behavior activities of interest in the network. Continuing with the banking Trojan example above, when monitoring future network traffic, the detection server can determine that an intrusion of a banking Trojan has happened if the detection server 120 detects that user behavior activities A, B, C, D are included in the network traffic from and to network 110. In some embodiments, after the system detects certain user behavior activities of interest in the network traffic, at 218, the detection server is configured to take security measures in response to the detection. For example, in the case of malignant user behavior activities, the detection server may configure a firewall to block the network traffic it deems malicious. In the case of more benign user behavior activities, the detection server may send to a network administrator an alert indicating that a policy has been violated, for example.

Figure 3:
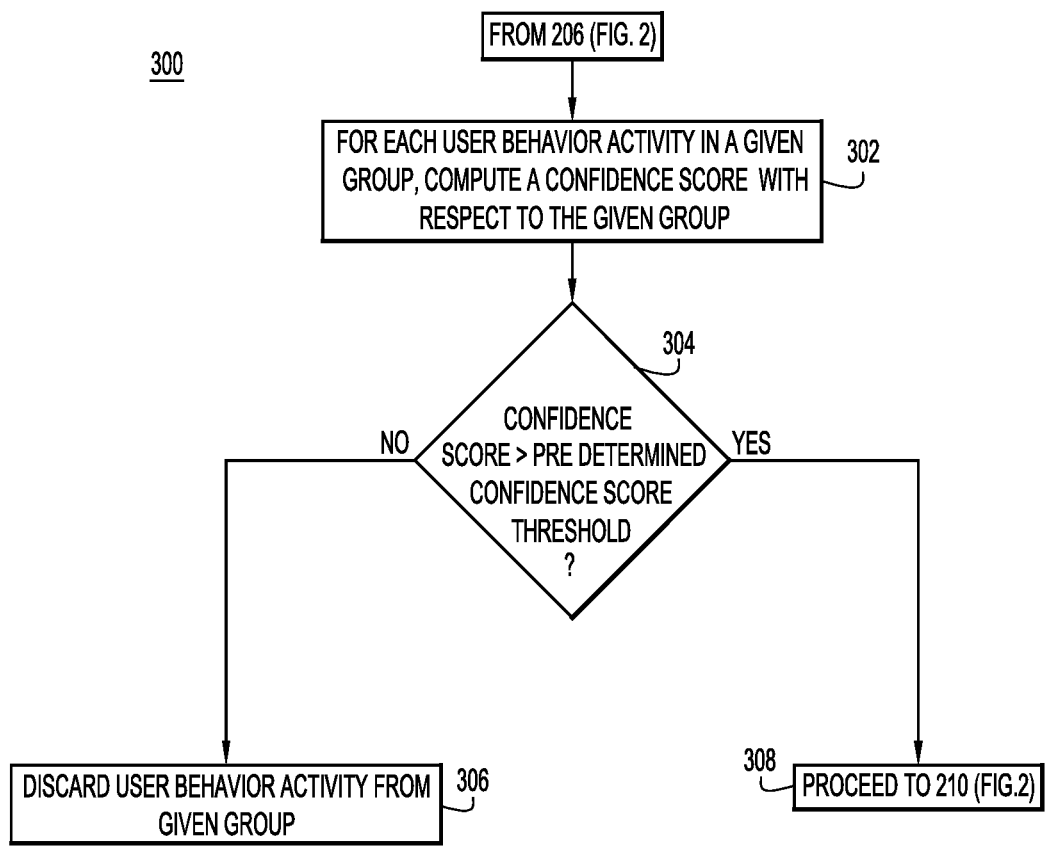
FIG. 3 is a flow chart depicting a method for reducing the number of user behavior activities for analysis, according to an example embodiment.

To further reduce its burden, in some embodiments, the detection server may reduce the number of user behavior activities in the subsets of network traffic assigned to each group before determining one or more detection rules at operation 214. To this end, reference is now made to FIG. 3. FIG. 3 is a flow chart depicting a method 300 for reducing the number of user behavior activities in each group, according to an example embodiment. At 302, for each user behavior activity in a given group, the detection server computes a confidence score for the user behavior activity with respect to the given group. For example, the detection server can compute, as a confidence score, a ratio of a number of occurrences of a user behavior activity within transactions of the given group to a number of occurrences of the user behavior activity in all of the transactions determined not to be suspected as relating to the certain user behavior activities. At 304, the detection server determines whether the confidence score is equal to or greater than a predetermined confidence score threshold. If the confidence score of the user behavior activity is less than the predetermined confidence score threshold (No at 304), at 306 the detection server discards the user behavior activity from the given group. One the other hand, if the confidence score is equal to or greater than the predetermined confidence score threshold (Yes at 304), at 308 the detection server proceeds to operation 210 (FIG. 2). In one embodiment, the user behavior activities that have a confidence score that is greater than or equal to the confidence score threshold are sorted according to their relevance within the given group.

Figure 4:
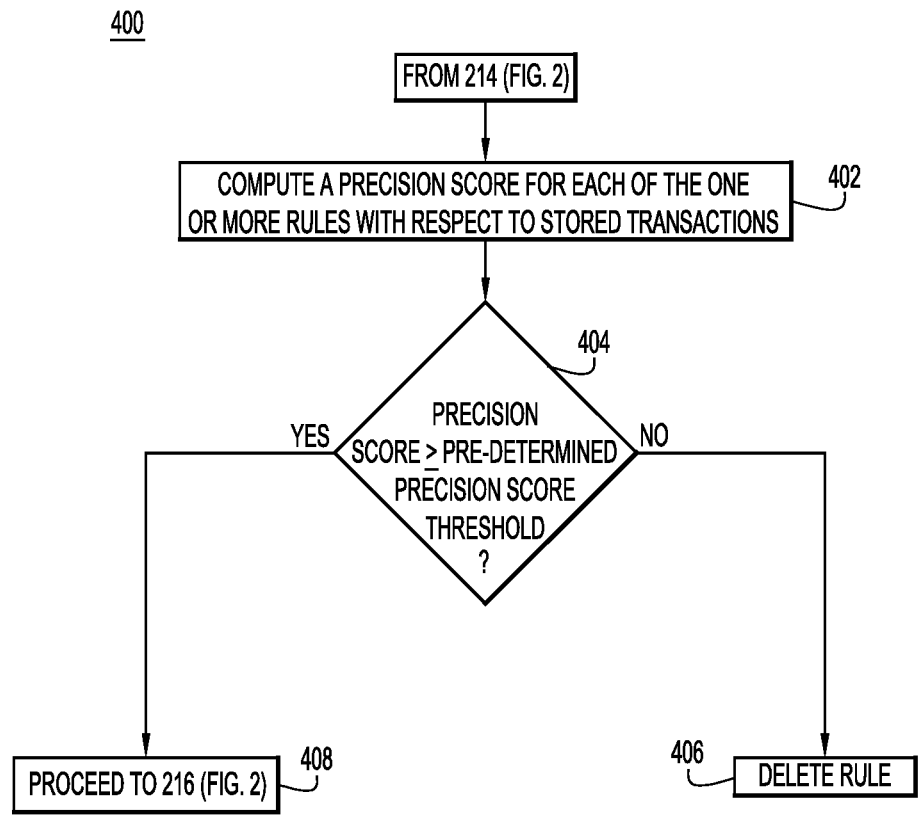
FIG. 4 is a flow chart depicting a method for deleting one or more rules for detecting user behavior activities of interest, according to an example embodiment.

In some embodiments, after one or more rules for detecting user behavior activities of interest have been generated, at any time the detection server may delete a rule if implementing the rule would affect one or more legitimate user devices/computing nodes. For example, legitimate user devices/computing nodes may improperly be denied Internet or other network access due to implementation/execution of the rule. Reference is now made to FIG. 4. FIG. 4 is a flow chart depicting a method 400 for deleting one or more rules used for detecting user behavior activities of interest, according to an example embodiment. At 402, the detection server computes a confidence/precision score for each of the one or more rules with respect to stored transactions. For example, the detection server may test a rule on the historical network traffic, which includes network traffic from legitimate computing node(s) and network traffic from malware-infected computing node(s) in the network 110. As a result, the detection server can estimate the number of legitimate users affected by the one or more mined rules. Based on the estimate, the detection server may compute a precision score for each of the one or more rules with respect to stored transactions. At 404, the detection server determines whether the computed precision score of a rule is equal to or greater than a predetermined precision score threshold. If the computed precision score of a rule is less than a predetermined precision score threshold (No at 404), at 406 the detection server deletes the rule. If the computed precision score of a rule is equal to or greater than a predetermined precision score threshold, at 408 the detection server proceed to execute operation 216 (FIG. 2).

Figure 5:
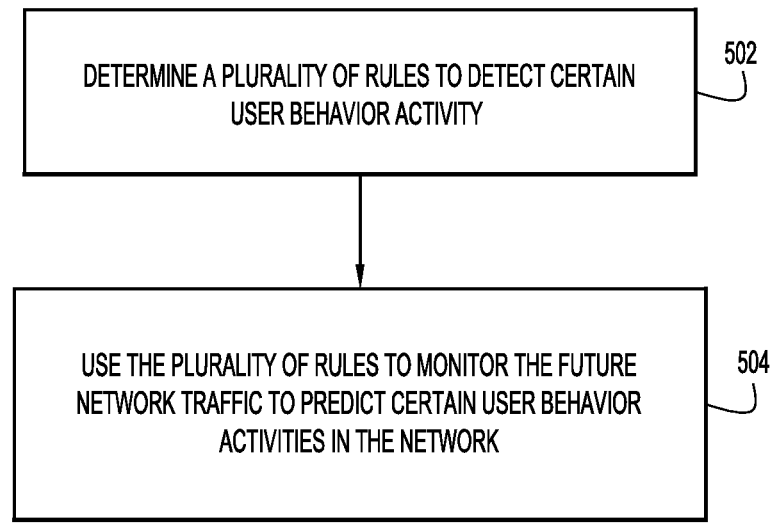
FIG. 5 is a flow chart depicting a detection rule transcription process, according to an example embodiment.

In some embodiments, the detection server may be configured to use rule transcriptions to predict unseen items and thus increase detection capabilities in the network 110. FIG. 5 is a flow chart depicting a method 500 for using rule transcription in this manner, according to an example embodiment. At 502, the detection server determines a plurality of rules to detect certain user behavior activities of interest. For example, the detection server determines a first rule (R1) and a second rule (R2) to detect certain user behavior activities of interest. The first rule R1 is configured to indicate that if a transaction includes a first user behavior activity A, the transaction would also include a second user behavior activity B. The first rule R1 can be expressed as: if {A}->{A, B}. The second rule R2 is configured to indicate that if the second user behavior activity B and a third user behavior activity C are included in a particular transaction, the particular transaction includes a certain user behavior activity of interest. The second rule R2 can be expressed as: If {B, C}->certain user behavior activity of interest. At 504, the detection server uses the plurality of rules to monitor future network traffic to predict certain user behavior activity in the network. Continuing the above example, the detection server uses first rule R1 and the second rule R2 to monitor future network traffic, and predicts that a transaction which includes the first user behavior activity A and the third user behavior activity C will include the certain user behavior activity of interest. Thus, based on the detection of the first user behavior activity A and the third user behavior activity C and before the detection of the second user behavior activity B in the network traffic, which is a pre-requisite for conclusively determining the presence of the certain user behavior activity of interest according to the second rule R2, the detection server can determine that certain user behavior activity of interest is present in the network, and move to take security measures (if the certain user behavior activity is malware-related) or alert a network administrator (if the certain user activity is benign). The techniques according to the illustrated embodiment enable a detection server to more efficiently detect certain user behavior activities of interest and, in the case of malware for example, possibly reduce the time needed to conclusively detect occurrence of malware and take actions to reduce or eliminate the threat.

In another rule transcription example, a third rule (R3) indicates that if a transaction includes user behavior activities A and B, the transaction would also include another user behavior activity C. R3 can be expressed as: if {A, B}->{A, B, C}. A fourth rule (R4) indicates that if the user behavior activity C and a fourth user behavior activity D are included in a particular transaction, the particular transaction includes malware-related activity. R4 can be expressed as: If {C, D}->Malware. Thus, based on the detection of the user behavior activities A, B, and D and before the detection of the user behavior activity C in the network traffic, which is a pre-requisite for conclusively determining the presence of malware according to the fourth rule R4, the detection server can determine that malware is present in the network, and move to block communications from and to the infected computing node.

Moreover, for malware infection cases that can be detected by existing malware detection techniques, the rules generated according to the techniques disclosed herein can generate new domain knowledge, improving insight into user behavior activities in a network, such as those associated with malware. For example, the techniques presented herein can be used to generate a rule that is used to detect a so-called Vawtrack infection. This rule contains the following user behavior activities: contacting a low probability domain; performing a suspicious process hash; performing a software update; downloading of favicon; and downloading graphical images. Although each of these user behavior activities is important, the most notable activities are the suspicious process hash because it marks a malicious binary, and, surprisingly, downloading of favicon and graphical images. Vawtrack is malware known for using steganography for multiple purposes. One of the purposes is a C&C scheme using inconspicuous favicon downloads and loading modules, which hide code in images using least significant bit replacement steganography. For example, one downloaded image may look innocent and harmless. However, the downloaded image in fact is a gif container holding several images, some of which are identical. When the identical images are examined closely, the tampered bits are clearly visible by naked eye. Thus, the rules generated by the techniques disclosed herein can detect new malware that is not identifiable by existing malware detection techniques, and also provide further malware intelligence insight with respect to malware that can be used for malware detection by any malware detection techniques now known or hereinafter developed.

The techniques disclosed herein include a process to convert network traffic into a set of transactions and rule mining techniques to extract rules from such transactions that combine weak IoCs and produce stronger evidence of certain user behavior activities. These techniques can be applied in cases where a number of certain user behavior activities may be significantly lower than the overall number of user behavior activities in the transactions. Moreover, these techniques do not require substantial computation and memory resources, even when applied to cases with hundreds of unique user behavior activities. The one or more mined rules can be used for detecting user behavior activities of interest, and new threats, thereby enhancing the intelligence about certain user behavior activities, such as, but not limited to, malware.

Rules extracted according to the techniques disclosed herein identify and classify malware, and provide description of malware behavior. Behavioral description may be much more robust than common signatures, because changing how malware behaves is much more difficult than changing the classical signatures based on binary hashes, Uniform Resource Locator (URL) patterns, IP addresses etc. Classification performed by such a classifier can be used to explain the incident to the users with more information than heretofore possible.

In summary, in one aspect, a method is provided, which includes, at a server in a network: monitoring network traffic relating to user behavior activities in the network; storing data representing network traffic within a plurality of time periods, each of the time periods serving as a transaction such that data for each of a plurality of transactions comprising one or more user behavior activities is stored over time; identifying subsets of the network traffic in the transactions as traffic suspected of relating to certain user behavior activities; assigning the subsets of the network traffic in the transactions into one or more groups based on one or more types of certain user behavior activities; determining one or more detection rules for each of the one or more groups of certain user behavior activities based on identifying, for each of the groups, a number of user behavior activities common to each of the subsets of the network traffic; and using the one or more detection rules to monitor future network traffic in the network to detect occurrence of the certain user behavior activities in the network.

In another aspect, an apparatus is provided. The apparatus includes a network interface that enables network communications, a processor, and, a memory to store data and instructions executable by the processor. The processor is configured to execute the instructions to: monitor network traffic relating to user behavior activities in the network; store data representing network traffic within a plurality of time periods, each of the time periods serving as a transaction such that data for each of a plurality of transactions comprising one or more user behavior activities is stored over time; identify a subset of the network traffic in the transactions as traffic suspected of relating to certain user behavior activities; assign the subsets of the network traffic in the transactions into one or more groups based on one or more types of certain user behavior activities; determine one or more detection rules for each of the one or more groups of certain user behavior activities based on identifying, for each of the groups, a number of user behavior activities common to each of the subsets of the network traffic; and use the one or more detection rules to monitor future network traffic in the network to detect occurrence of the certain user behavior activities in the network.

In yet another aspect, a non-transitory computer-readable storage media encoded with software comprising computer executable instructions which, when executed by a processor, cause the processor to: monitor network traffic relating to user behavior activities in the network; store data representing network traffic within a plurality of time periods, each of the time periods serving as a transaction such that data for each of a plurality of transactions comprising one or more user behavior activities is stored over time; identify subsets of the network traffic in the transactions as traffic suspected of relating to certain user behavior activities; assign the subsets of the network traffic in the transactions into one or more groups based on one or more types of certain user behavior activities; determine one or more detection rules for each of the one or more groups of certain user behavior activities based on identifying, for each of the groups, a number of user behavior activities common to each of the subsets of the network traffic; and use the one or more detection rules to monitor future network traffic in the network to detect occurrence of the certain user behavior activities in the network.

The above description is intended by way of example only. Various modifications and structural changes may be made therein without departing from the scope of the concepts described herein and within the scope and range of equivalents of the claims.

What is claimed is:

1. A method comprising:
   at a server in a network:
   monitoring network traffic relating to user behavior activities in the network;
   storing data representing network traffic within a plurality of time periods, each of the time periods serving as a transaction, wherein data for each of a plurality of transactions comprises one or more user behavior activities stored over time;

identifying subsets of the network traffic in the transactions as traffic suspected of relating to certain user behavior activities;

assigning the subsets of the network traffic in the transactions into one or more malware groups based on one or more types of certain user behavior activities;

determining one or more detection rules for each of the one or more malware groups of certain user behavior activities based on identifying, for each of the malware groups, a number of user behavior activities common to each of the subsets of the network traffic, wherein each user behavior activity that is common to each of the subsets of the network traffic is a different user behavior activity that co-occurs in each of the subsets of the network traffic; and using the one or more detection rules to monitor future network traffic in the network to detect occurrence of the certain user behavior activities in the network.

2. The method of claim 1, wherein the number of user behavior activities common to the subsets of the network traffic in a malware group is equal to or more than three, and wherein determining the one or more detection rules further comprises determining only detection rules that are associated with three or more user behavior activities common to the subsets of the network traffic in the malware group.

3. The method of claim 1, further comprising:
clustering a plurality of user behavior activities that share a common attribute into respective one or more labeled user behavior activities, and wherein the determining is performed based on the labeled user behavior activities.

4. The method of claim 1, further comprising:
for each user behavior activity in a given malware group, computing a confidence score with respect to the given malware group; and
wherein the determining is performed for user behavior activities having at least a predetermined confidence score.

5. The method of claim 4, wherein computing the confidence score comprises:
computing a ratio of a number of occurrences of a user behavior activity within transactions of the given malware group and a number of occurrences of the user behavior activity in all of the transactions determined not to be suspected as relating to the certain user behavior activities.

6. The method of claim 1, further comprising:
computing a precision score for each of the one or more detection rules with respect to stored transactions; and
deleting a particular detection rule if a precision score of the particular detection rule is less than a predetermined precision score threshold.

7. The method of claim 1, further comprising using a plurality of the detection rules to predict occurrence of the certain user behavior activities in the network.

8. The method of claim 1, wherein each malware group is associated with a malware type.

9. An apparatus comprising:
a network interface that enables network communications;
a processor; and
a memory to store data and instructions executable by the processor,
wherein the processor is configured to execute the instructions to:

monitor network traffic relating to user behavior activities in a network;

store data representing network traffic within a plurality of time periods, each of the time periods serving as a transaction, wherein data for each of a plurality of transactions comprises one or more user behavior activities stored over time;

identify a subset of the network traffic in the transactions as traffic suspected of relating to certain user behavior activities;

assign the subsets of the network traffic in the transactions into one or more malware groups based on one or more types of certain user behavior activities;

determine one or more detection rules for each of the one or more malware groups of certain user behavior activities based on identifying, for each of the malware groups, a number of user behavior activities common to each of the subsets of the network traffic, wherein each user behavior activity that is common to each of the subsets of the network traffic is a different user behavior activity that co-occurs in each of the subsets of the network traffic; and use the one or more detection rules to monitor future network traffic in the network to detect occurrence of the certain user behavior activities in the network.

10. The apparatus of claim 9, wherein the number of user behavior activities common to each of subsets of the network traffic in a malware group is equal to or more than three and wherein determining the one or more detection rules further comprises determining only detection rules that are associated with three or more user behavior activities common to the subsets of the network traffic in the malware group.

11. The apparatus of claim 9, wherein the processor is further configured to execute the instructions to:
cluster a plurality of user behavior activities that share a common attribute into respective one or more labeled user behavior activities, and wherein the determining is performed based on the labeled user behavior activities.

12. The apparatus of claim 9, wherein the processor is further configured to execute the instructions to:
for each user behavior activity in a given malware group, compute a confidence score with respect to the given malware group,
wherein the processor determines the one or more detection rules for the user behavior activities having at least a predetermined confidence score.

13. The apparatus of claim 12, wherein the processor is further configured to execute the instructions to:
compute a ratio of a number of occurrences of a user behavior activity within transactions of the given malware group and a number of occurrences of the user behavior activity in all of the transactions determined not to be suspected as relating to the certain user behavior activities.

14. The apparatus of claim 9, wherein the processor is further configured to execute the instructions to:
compute a precision score for each of the one or more detection rules with respect to stored transactions; and
delete a particular detection rule if a precision score of the particular detection rule is less than a predetermined precision score threshold.

15. The apparatus of claim 9, wherein the processor is further configured to execute the instructions to:
use a plurality of the detection rules to predict occurrence of the certain user behavior activities in the network.

16. The apparatus of claim 9, wherein the certain user behavior activities include benign user behavior activity or malicious user behavior activity.

17. A non-transitory computer-readable storage media encoded with software comprising computer executable instructions which, when executed by a processor, cause the processor to:
- monitor network traffic relating to user behavior activities in a network;
- store data representing network traffic within a plurality of time periods, each of the time periods serving as a transaction, wherein data for each of a plurality of transactions comprises one or more user behavior activities stored over time;
- identify subsets of the network traffic in the transactions as traffic suspected of relating to certain user behavior activities;
- assign the subsets of the network traffic in the transactions into one or more malware groups based on one or more types of certain user behavior activities;
- determine one or more detection rules for each of the one or more malware groups of certain user behavior activities based on identifying, for each of the malware groups, a number of user behavior activities common to each of the subsets of the network traffic, wherein each user behavior activity that is common to each of the subsets of the network traffic is a different user behavior activity that co-occurs in each of the subsets of the network traffic; and
- use the one or more detection rules to monitor future network traffic in the network to detect occurrence of the certain user behavior activities in the network.

18. The non-transitory computer-readable storage media of claim 17, wherein the number of user behavior activities common to each of subsets of the network traffic in a malware group is equal to or more than three and wherein determining the one or more detection rules further comprises determining only detection rules that are associated with three or more user behavior activities common to the subsets of the network traffic in the malware group.

19. The non-transitory computer-readable storage media of claim 17, wherein the instructions cause the processor to:
- cluster a plurality of user behavior activities that share a common attribute into respective one or more labeled user behavior activities, and wherein the determining is performed based on the labeled user behavior activities.

20. The non-transitory computer-readable storage media of claim 17, wherein the certain user behavior activities include benign user behavior activity or malicious user behavior activity.

* * * * *